Dec. 9, 1941.   H. H. PLATT   2,265,193
AIRCRAFT
Original Filed Feb. 2, 1934   8 Sheets-Sheet 4
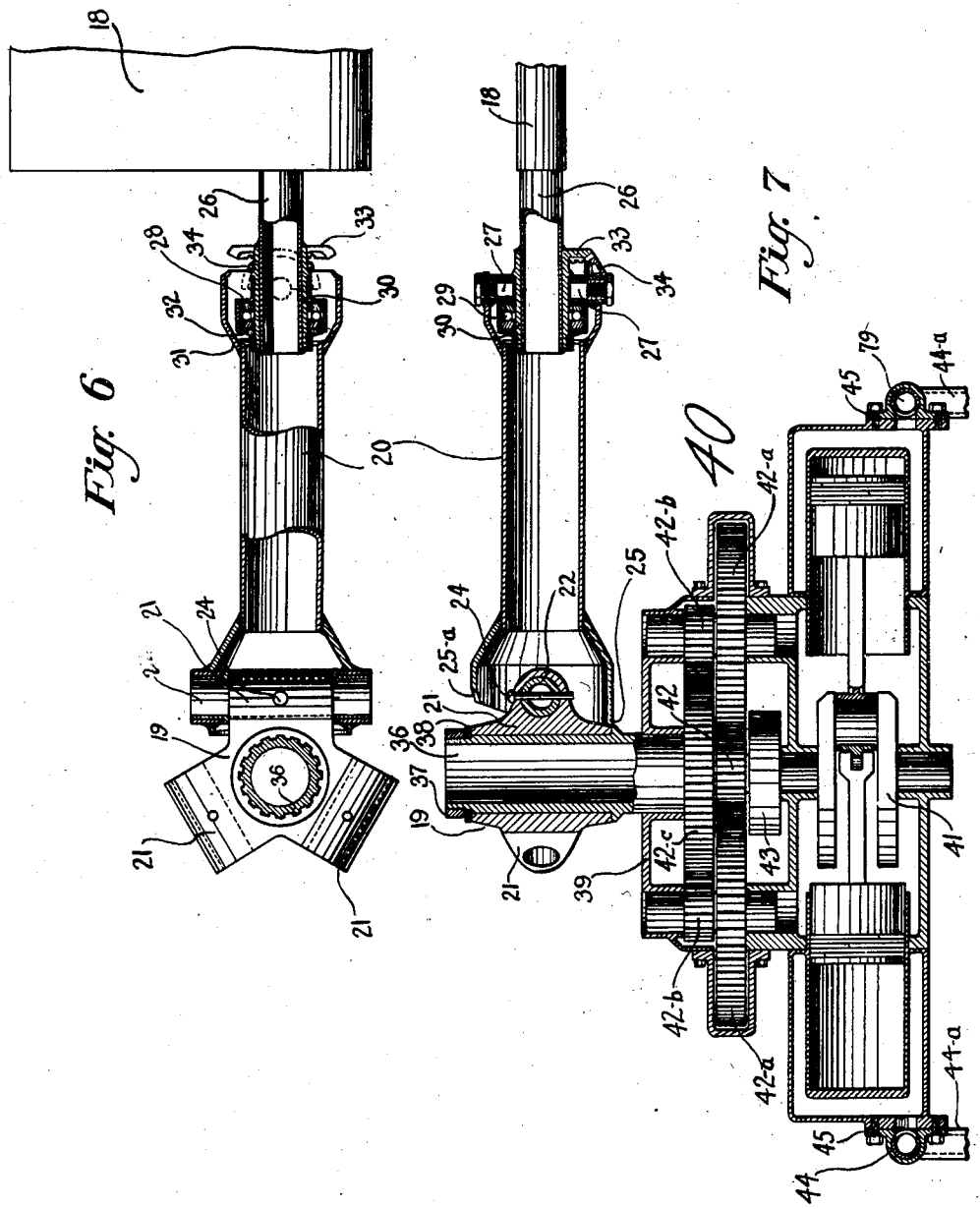
INVENTOR.
Haviland H. Platt
BY
Leonard L. Kalish
ATTORNEYS.

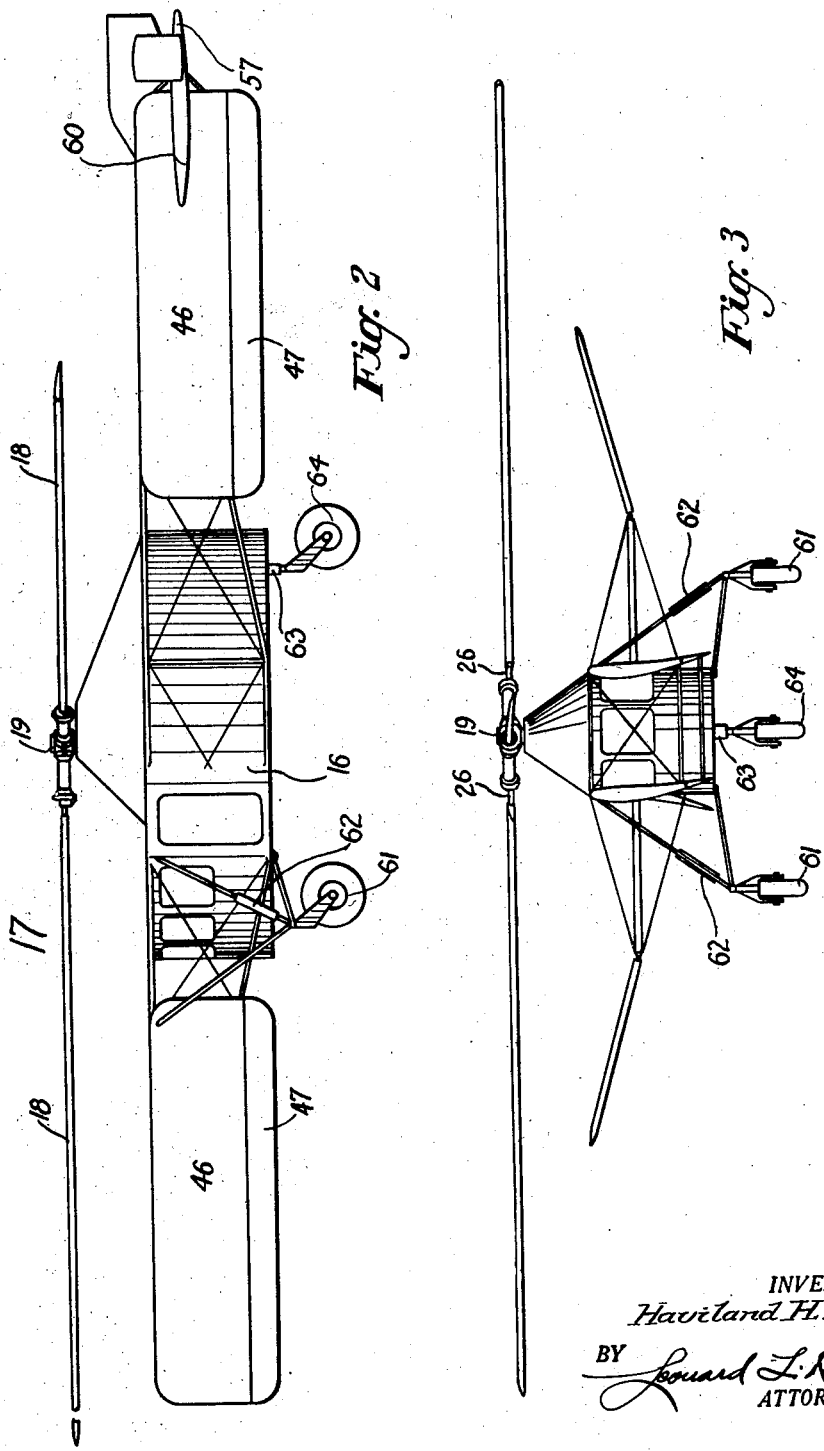

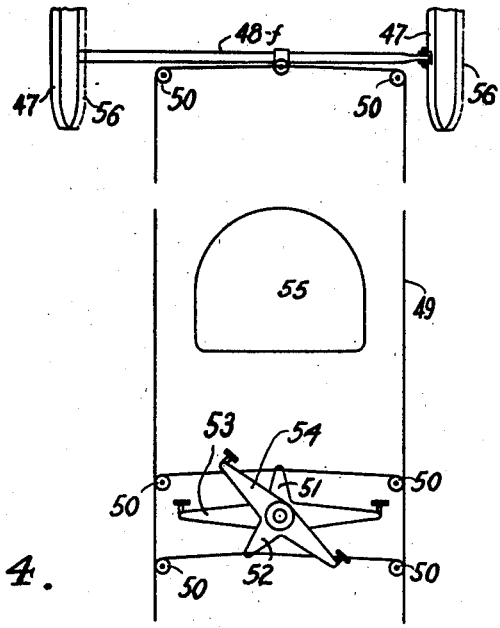
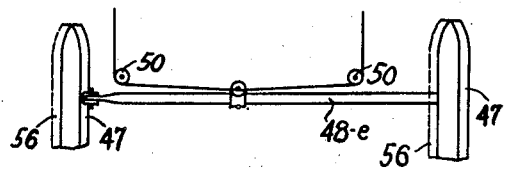
Fig. 4.
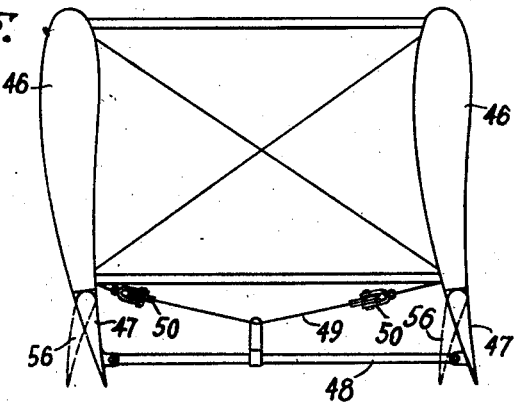
Fig 5.

Dec. 9, 1941.   H. H. PLATT   2,265,193
AIRCRAFT
Original Filed Feb. 2, 1934    8 Sheets-Sheet 6

INVENTOR.
Haviland H. Platt
BY Leonard L. Kalish
ATTORNEYS.

Dec. 9, 1941.      H. H. PLATT      2,265,193
AIRCRAFT
Original Filed Feb. 2, 1934      8 Sheets-Sheet 7

INVENTOR.
Haviland H. Platt
BY
Leonard L. Kalish
ATTORNEYS.

Patented Dec. 9, 1941

2,265,193

UNITED STATES PATENT OFFICE 2,265,193

AIRCRAFT

Haviland H. Platt, New York, N. Y., assignor to Rotary Research Corporation, Philadelphia, Pa., a corporation of Pennsylvania Original application February 2, 1934, Serial No. 709,485. Divided and this application March 22, 1937, Serial No. 133,072

32 Claims. (Cl. 244—17)

This application is a division of petitioner's co-pending application Serial No. 709,485, filed February 2, 1934.

My invention relates to the heavier-than-air type of aircraft sometimes generally referred to as the "helicopter" and it relates more particularly to certain novel features of control and stability, including pitch regulation, which remove the disabilities and disadvantages which have hitherto prevented this type of craft from attaining practical utility.

It is well known that the helicopter has hitherto been prevented from achieving the advantages of controlled vertical as well as horizontal flight because of certain limitations, to wit:

Difficulty in balancing the torque reaction of the lift screw; instability in various flight conditions; inadequacy of control; insufficient provision for efficient propulsion in forward flight; insufficient provision for safe landing in case of engine failure; excessive resistance to forward motion; mechanical complexity, particularly in the power transmission; excessive weight of supporting and power transmission means; and danger from gyroscopic effects.

One of the objects of my present invention is to overcome in a practical way, some of the above outlined limitations of the prior art.

With such, and other objects in view, which will appear more fully from the following detailed description, my invention includes novel arrangement of anti-torque surfaces or aerofoils cooperating with the slip stream of the lift screw to counteract the torque reaction incident to the transmission of power from the body of the craft to the lift screw, which anti-torque surfaces or aerofoils will not only correctly balance the torque reaction but will offer low air resistance in forward flight.

Another phase of my invention contemplates or includes novel control means cooperating with the anti-torque surfaces for controlling the forward motion, or the direction of pointing of the aircraft, which will be effective not only in forward flight, but which will also be effective in vertical ascent or descent, and also when the aircraft has no "air speed" in any direction. My invention further contemplates means whereby the proper function of these controls may be attained in "power-off" flight conditions.

Another phase of my invention contemplates the use of a lift screw, an articulated rotor with the blades so pivoted or articulated and with the pivotally related portions or members so interconnected that the blades will automatically assume positions in which all the forces, including the centrifugal forces acting upon the blades, are in complete balance, whereby undesirable gyroscopic effects are largely eliminated, and great stability provided at low speeds, particularly in vertical operation, by reason of the dihedral angle presented by the rotor while in operation.

A further phase of my present invention contemplates or includes automatic means for varying the pitch of the blades of the rotor which will be responsive to the driving torque, thus automatically varying the thrust and the rotative resistance of the rotor according to the requirements of the various conditions of engine throttle, without the need of separate manual control on the part of the operator.

Another phase of my invention contemplates and includes over-running clutch means associated with the rotor, in combination with said automatic torque-responsive pitch control, which automatically insures the correct blade angle setting for safe descent in case of power failure, and which thereby greatly increases the factor of safety of the craft by guarding against sudden and unexpected engine failures, and by making the craft proof against any error in judgment or carelessness on the part of the operator, since the craft is automatically adjusted for vertical descent in the event of a power failure.

Another phase of my invention includes means including control surfaces responsive to the rotor slip stream whereby both vertical and horizontal flight may be effected by a change of attitude or by a variation of the angle or "tilting" of the fuselage in the vertical median plane, so that a horizontal component of the thrust of the rotor may be developed, variable at the will of the operator, according to the extent of the tilting of the fuselage. Thus, this phase of my invention contemplates rotor-slip-stream responsive means for tilting the craft in the vertical median plane, between suitable limits, for developing a horizontal component of the thrust of the rotor for the desired horizontal or forward propulsion. By reason of the articulated character of the rotor, and its automatic adjustment to the forces imposed upon it, one phase of my present invention provides more efficient forward propulsion by the elimination of power losses generally unavoidable in conventional form of propulsion by means of conventional propeller arrangements.

Another phase of my present invention consists of a certain offset arrangement of the anti-torque surfaces, whereby certain undesirable distribution of forward flight forces, now common to articulated rotors, may be satisfactorily overcome.

Another phase of my present invention consists of certain novel arrangement of engine controlling means including the provision of radiators in the anti-torque surfaces, whereby the engine may effectively be cooled under all power-driven conditions.

Another phase of my present invention consists of the novel combination with some of the foregoing, of adjustable under-carriage for permitting the inclination of the craft to the desired angle, while the craft is on the ground, so that the relation between the horizontal and vertical components of the thrust of the rotor may be controlled even when the craft is on the ground, thereby facilitating ground maneuvers and facilitating take-offs and also landings.

Another phase of my present invention consists of the novel combination with a rotor, of a "geared" engine having a generally upright shaft or crank-shaft, with the engine more or less directly adjacent to the rotor, with the rotor mounted upon the extending shaft in a more or less closely coupled relation, without the use of any intermediate shafting, and whereby also the rotor may be supported directly by the housing of the geared engine.

Another and alternative phase of my present invention consists of certain novel means for longitudinal control, including means for tilting the rotor, the power plant, and the anti-torque surface assembly relative to the fuselage in the vertical median plane of the latter.

My invention also includes other novel features of construction forming part of one or more of the principal phases of the invention above outlined, all of which will appear more fully from the following detailed description.

For the purpose of illustrating my invention, I have shown in the accompanying drawings, forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in which like reference characters indicate like parts:

Figure 2 represents a similar and also more or less schematic side elevational view of the same, illustrating the general arrangement and disposition of the anti-torque surfaces and the lateral control means connected therewith.

Figure 3 represents a front elevational view of the same, also shown in more or less schematic fashion, further illustrating the relationship of the various parts, particularly the setting of the anti-torque surfaces; the tail surfaces, and the under-carriage.

Figure 4 represents a diagrammatic top plan view of the lateral control elements (the supporting structure, such as fuselage, being omitted), shown on a scale somewhat different than the scale to which Figure 1, for instance, is drawn.

Figure 5 represents a corresponding diagrammatic front elevational view of the front anti-torque surfaces and control flaps associated therewith, and forming a part thereof, further illustrating the operation of the lateral control means.

Figure 6 represents a fragmentary sectional view, on an enlarged scale, of the rotor hub and one of the pivotal blade supports, including the pitch regulator.

Figure 7 is a fragmentary sectional view on a similarly enlarged scale, generally on line 7—7 of Figure 1, showing the rotor hub, the blade attachment, the pitch regulator and a more or less diagrammatic outline of a power plant and transmission arrangement in close coupled relationship to the rotor.

Figure 1:
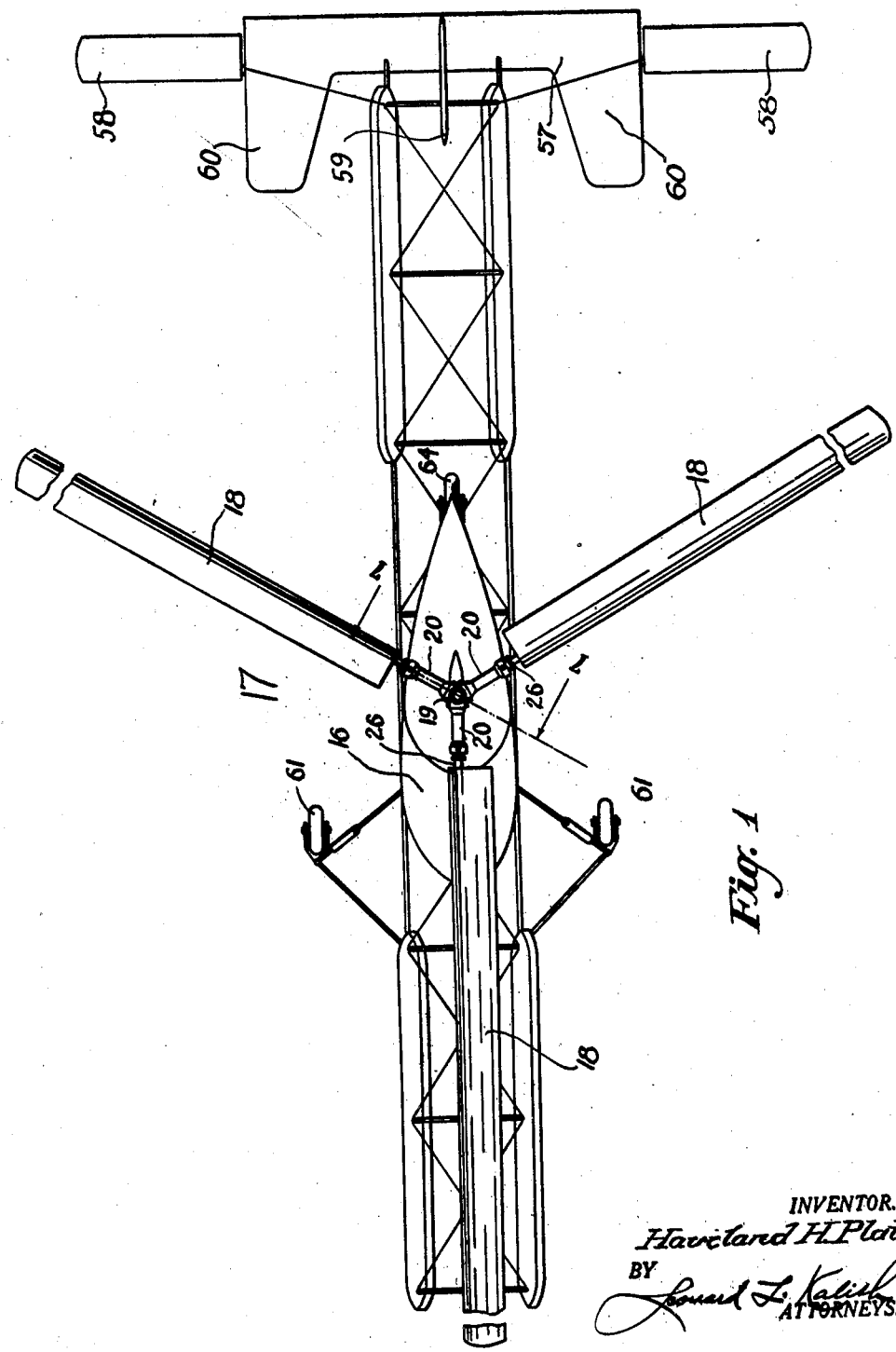
Figure 1 represents a generally schematic top plan view of an aircraft embodying my invention, this top plan view showing the general arrangement and the disposition of the rotor, the fuselage, the anti-torque surfaces, and the tail surfaces in relation to each other.

In the accompanying drawings, the fuselage of the aircraft of my present invention is designated generally by the numeral 16. The fuselage may be of any suitable shape and construction, as may be necessary to provide seating space for the pilot and passengers, door and window space, attachment for the landing gear and anti-torque surfaces, suitable mounting for the power plant, and as otherwise may be required by the necessary strength and wind resistance.

The lift screw or rotor, designated generally by the numeral 17, is mounted above the fuselage and is arranged to rotate about a generally upright axis passing through the central portion of the fuselage.

The rotor comprises a plurality of aerofoil blades 18 of suitable cross-section. Three blades are shown in the illustrations although it is possible to vary this number, and for some purposes it may be desirable to use four or more blades. Each of the blades 18, as shown particularly in Figures 6 and 7, is attached to the driving hub 19 through an intermediate link or stub 20, which may be of tubular formation or of any other suitable cross-section. The stubs may be enlarged at each of their ends, to form the outer members of pivot joints. The inner end of each stub is pivotally attached to one of a plurality of suitable lugs 21 by means of a pivot pin 22, which passes through a hole in the lug and through suitable bearing openings in bosses formed in the enlarged inner end of the stub 20 which surrounds the lug 21. The pin 22 may be held in place by any suitable means, as for instance, by the flat-head pin 24 and a cotter pin extended through the free end thereof.

The pivot joints so formed, allow the stubs 20, and their respective blades 18 to swing or flap freely in corresponding planes in which the hub axis generally lies; the downward limits of deflection being fixed by any suitable means known in the art or by the contacting of the stub end with the hub, as at 25, while the upper limits of deflection may be similarly determined by the contacting of the upper terminal edge (25—a) of the stub 20 with the hub. These limits are established arbitrarily by the form of the stub-end, and are so arranged as not to interfere with the perfect freedom of the blade (within the necessary limits of downward and upward deflection) to find its equilibrium position, as determined by the balance of centrifugal and lift forces, under all operating conditions.

At its outer end, the stub 20 is attached to the tubular spar 26 of the blade 18, by means of a double pivot joint including the pivot pins or trunnions 27, which may be secured to the stub 20, by threading into bosses formed in its enlarged outer end (or by any other suitable means). The axis of the trunnions 27 is disposed generally transversely of the direction of the axis of the pivot pin 22, and more or less at a right angle thereto. As a result, the blade is permitted to swing freely, within suitable limits, in the surface of rotation, and is permitted under all operating conditions, to assume a position of lag determined by the balance between the centrifugal force of the blade and the aerodynamic drag force on the blade. The pivot pins or trunnions 27, instead of engaging the blade spar 26 directly, are journalled in, and engage appropriate opposed bearing openings in an annular collar or fitting 28, which is recessed to receive any suitable thrust bearing, such as the ball thrust bearing 29. A sleeve 30, surrounding and rigidly attached to the inner end of the blade spar 26 (by welding or otherwise) is longitudinally retained, with rotational freedom, within the annular fitting 28, by any suitable means, such as the nut 31 and the washer 32. The outward force of the blade, resulting mainly from the centrifugal force due to its mass, is thus borne by the ball (or other) thrust bearing and the blade is free to rotate on the axis of the spar 26, with a minimum of friction, while at the same time freely pivoted about the pivots 22 and 27.

A fragmentary bevel-gear, or bevel segment 33 is secured to, or formed integrally with the outer end of the sleeve 30, in coaxial relation thereto, and meshes with a corresponding bevel-gear segment 34 rigidly attached to, or formed integrally with the end of the stub 20, in coaxial relation to the pivots or trunnions 27. It is evident that a lag of the blade under the influence, for example, of an aerodynamic drag force, will cause the bevel-gear segment 33 to roll on bevel-gear segment 34, thus causing the blade spar sleeve 30, spar 26 and blade 18 to rotate on their common axis, and so to change the pitch of the blade, that is, its angle relative to the surface of rotation. The two bevel-gear segments may be replaced by a pin and slot or other suitable linkage, for effecting the mechanical correlation of the lag and pitch angles of the blade, which constitutes one phase or feature of my invention.

The angular deflection of the blade 18 with respect to the stub 20 (about the pivots 27) is preferably limited by any suitable means, as for instance, but causing the opposed terminal portions of the edge of the segment 33 to abut against corresponding end portions of the stub 20. The opposed terminal portions of the segment 33 are preferably blank, that is, devoid of teeth, so as to form better "stops." The forward "stop" is preferably so set as to limit the forward deflection of the blade to approximately the angular position (about the pivot 27) normally assumed by the blade under purely autorotative conditions (or slightly ahead of such position); while the rearward deflection is preferably set to correspond to the maximum blade-pitch angle which may be desired or permissible under maximum power-loading of rotor.

The rotor hub 19 is preferably rigidly mounted on the short drive shaft 36, by any suitable means, such as the splined construction shown, the nut 37 and washer 38. The drive shaft 36, suitably journalled in the crank case supporting structure or housing 39 of the geared power plant 40, is driven by the crank shaft 41 through the reduction gearing 42; 42—a; 42—b, and 42—c, housed in the housing 39. The cylindrical casing 43, interposed between the crank shaft and the reduction gearing contains an overrunning or free-wheel clutch unit of any of the well-known types, which provides a positive drive from the crank shaft to the drive shaft but nevertheless allows the rotor to continue to rotate freely in case of a slowing down or stopping of the crank shaft. The outer surface of the casing 43 may be used as a brake drum, by the addition of a suitable brake band and mechanism for actuating it, in order to stop the rotation of the rotor after landing. If desired, the free-wheeling or over-running clutch may be placed on the delivery end of the gear train, as for instance in the hub of the last gear (adjacent to rotor shaft) or in a suitable housing intermediate the last gear and the rotor shaft.

The power plant 40 is rigidly supported on suitable horizontal frame members 44 and upright frame members 44—a of the fuselage, as by means of the fittings 45. While the power plant shown is of the radial liquid-cooled type, the advantages of this novel arrangement of close-coupled rotor and power plant mounting (which are, among other things, rigidity; reliability; simplicity; and light weight), are not confined to any one form of engine.

The frame of the fuselage is extended at each end to support the plurality of antitorque surfaces 46 which are cambered airfoil surfaces set with their leading edges generally upward, but so disposed as to meet the rotor slipstream, or air forced downward by the rotor when power driven, at a "lift angle." Furthermore, all the antitorque surfaces are so inclined with relation to the rotor slip stream as to produce lift forces tending to rotate the fuselage in the same direction and about the same axis as the rotor, which is in the direction opposite to the torque reaction incident to the power delivered into the rotor.

With sufficient area and suitable proportions, the antitorque surfaces are capable of providing a complete force balance, thus enabling the aircraft to hover motionless in the air or rise vertically without any tendency to turn or sideslip. This completeness of balance is not possible with any unsymmetrical arrangement of antitorque moments. Furthermore, the parallel arrangement of the antitorque surfaces, with the minimum of area opposed to forward motion, permits the attainment of the highest possible flight speeds, because the drag of the anti-torque elements is at a minimum in forward flight. While four antitorque surfaces are shown as being probably most suitable for the design illustrated, any other number, such as two or six may alternatively be used with modified forms of the design.

For purposes of directional control and of regulation of the magnitude of the anti-torque moments, to meet varying conditions of operation, each one of the anti-torque surfaces is fitted at its lower, or trailing, edge with a hinged flap 47, similar to the aileron of the conventional airplane wing. These flaps connected by the link rods 48—e and 48—f, which are in turn attached to control cables 49 running over pulleys 50 fixed to the frame, as particularly illustrated in the diagrammatic Figures 4 and 5. The control cables (shown broken in Figure 4 in order to bring the parts close together) are led into the fuselage and are attached through two cross strands to the horns or bell-crank arms 51 and 52 of the two coaxially mounted rudder bars 53 and 54, respectively, which may be conveniently located with relation to the pilot's seat 55. With the arrangement shown, pushing forward with the right foot on rudder bar 53 will move all four control flaps in such a direction as to increase the effective camber of each of the four antitorque surfaces, while a similar forward motion of the left foot acts correspondingly to decrease their effective camber. On the other hand, pushing forward with the right foot on the rudder bar 54 until it is moved into a transverse position swings the flaps into the dotted positions 56, at which the camber and angle of the antitorque surfaces are approximately neutralized for autorotative conditions of operation. The motion of the flaps resulting from turning the rudder bar 54, is now opposite in direction to that produced by the turning of rudder bar 53, which has been swung to an oblique position by the act of turning rudder bar 54 into the transverse attitude.

Attached to the rear end of the fuselage frame extension is the tail assembly consisting of a transversely pivoted control surface, or elevator 57, which is connected in the manner usual in airplane practice to a control stick of conventional design (not shown). At each end of the elevator is mounted a pivoted aileron 58 set at a dihedral angle suitable for providing adequate stability in forward flight. The ailerons are also connected to the control stick in the manner usual in airplane practice for opposite or differential movements. A fixed vertical fin 59 is provided for directional stability, although its function may alternatively be served by an extension of the rear anti-torque surfaces. The elevator 57 differs from that usual in airplane practice in that it has no horizontal fixed fin associated with it, and in that it is equipped with two forward extensions, or tabs 60, capable of being deflected into the slipstream of the rotor; whereby the craft may be tilted to varying degrees (while in flight). All other parts of the tail assembly are located outside the boundary of the slipstream when the craft is not moving forward. No vertical rudder is shown but may be added, if desired, for auxiliary directional control.

The undercarriage, a landing gear, may be given any of a number of forms. That shown, comprises three wheels of the freely trailing caster type, permitting rolling in any direction; the two front wheels 61 being attached to the fuselage by suitable shock absorbing struts 62. The third wheel 64 is mounted at the rear of the fuselage by means of an adjustable strut 63 which may be raised or lowered at the will of the pilot by suitable mechanism within the fuselage, such as a thread and nut actuated by a worm wheel and worm, or the like (not shown). The rear wheel may thereby be raised or lowered so as to change the inclination of the craft while resting on the ground. If desired, any or all of the wheels may be equipped with brakes and stops to prevent swiveling, at the will of the operator, for aid in ground maneuvering. Moreover, any or all of the three caster wheels may be replaced by plain wheels, skids, floats, skis, etc., as may be required for different types of service. Also the number of ground contacting members may be varied from the number shown.

Figure 15:
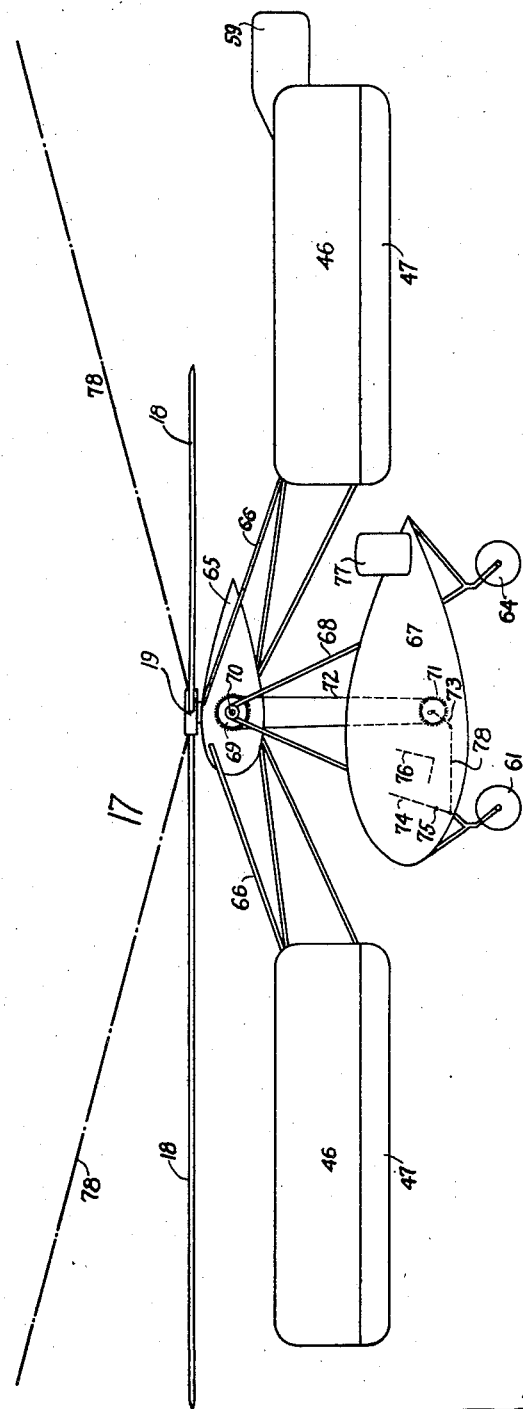
Figure 15 represents a diagrammatic side elevational view of a modified form of aircraft embodying certain alternative phases or features of my present invention, and differing from the construction illustrated in Figures 1, 2, 3, 4, 9, 10, 12, 13 and 14, principally in the means provided for longitudinal control.

In the arrangement illustrated in Figure 15 longitudinal control is obtained by tilting the rotor relative to the fuselage instead of by tilting the entire machine. Since the simplicity of the rotor drive would be impaired by an articulation of the drive shaft and also because a shift in rotation axis relative to the antitorque surfaces would give rise to an unbalanced torque reaction component, the rotor 17, the power plant (here shown covered by a stream-line fairing 65), and the antitorque surfaces 46 are maintained in rigid alignment in the same relationship as before. The anti-torque surfaces are in this case however, not supported by the fuselage frame but, through suitable framework 66, are attached directly to stationary parts of the power plant. The short fuselage 67 is suspended below the power plant by means of a rigid frame 68 which is pivotally mounted, on a generally horizontal transverse pivot 70, placed preferably slightly above the static center of gravity of the power plant, rotor and antitorque surface assembly, but as close to the hub of the rotor blades as possible structurally, thereby to reduce and minimize the moment produced by the rotor thrust, about pivot 70, and thereby to minimize the manual effort which may be required for operating the tilting control. The angular relation of the fuselage to said assembly may be varied, and means are provided whereby the pilot may change this angular relationship at will. The control means provided for this purpose may be any of a number of simple mechanical arrangements of which the one employed here has been chosen primarily for cleanness in illustration. It consists in a sprocket 69 rigidly attached to the power plant, or other suitable part of the aforementioned assembly, coaxially with respect to the pivot 70, a second sprocket 71, the control stick 74 of conventional design pivoted in the usual manner at 75, and a link 78 connecting the lower end of the stick 74 with the end of the lever 73. Thus, when the pilot, sitting in seat 76, moves the upper end of the control stick forward, the rotor axis is also tilted forward relative to the fuselage.

The fixed fin 59 (and the vertical rudder, if provided) may be retained at the rear end of the antitorque surfaces. The horizontal control surface, or elevator, is however dispensed with, since its functions have been transferred to the rotor tilting device. The ailerons 77, similar to ailerons 58, may be retained at the rear or moved forward to the position shown, and mounted directly on the fuselage 67, their control connections to the control stick 74 remaining of the type hereinabove described.

The directional control provision is the same as in the rigid fuselage construction hereinabove described, except that additional means (not shown) are employed for assuring proper operation of the actuating cables regardless of the angular relation between the fuselage and antitorque surfaces. Since devices for this purpose are well known in the mechanical arts, no specific description is included here. Thus, for instance, the cables 49 may be extended upwardly to the rotor-motor assembly and then outwardly to the ailerons 47 (over suitable pulleys), or the transmission of the motion from the fuselage to the overhead rotor, motor, and antitorque assembly may be effected through shafts and suitable gearing, or by other suitable mechanical means. In either event, the transmitting means would enter the rotor, motor and antitorque assembly through some means more or less concentrically related or coaxially related to the pivot 70.

The landing gear is similar to that previously described, except that the provision for changing the ground attitude is omitted because the rotor tilting control serves the same purpose.

In Figure 15 the dot-dash lines 78 show the approximate outline of the conical surface in which the blades 18 revolve when supporting the weight of the machine in vertical flight.

In aircraft, which at times move through the air slowly, difficulty has been experienced in cooling the engine adequately, owing to the low air velocities available. In a machine designed to stand still in the air this problem becomes even more acute. According to one phase of my present invention, the antitorque surfaces 46 may be used as radiators by circulating the cooling liquid from the engine cylinder jackets through tubes embedded in, or forming the skin of the fixed portions of all or a part of the antitorque surfaces or elements. The antitorque surface supporting frame members may, if of tubular construction, be employed to convey the liquid to and from the radiating surfaces; and a method of connection to the engine cylinders is illustrated at 79 in Figure 7, wherein the tubular frame members 44 and 44—a serve as conduits, through the fittings 79 which also serve to secure the engine to the horizontal frame members. With this arrangement, the air velocity of the rotor slip stream is always available when the power is on and the additional air resistance of a radiator or of cooling fins is avoided. Likewise, in forward speed, the air-speed of the craft is not greatly hindered since the antitorque surfaces or elements present relatively small areas in the forward direction.

One of the greatest difficulties heretofore encountered in helicopter design has been to provide both for adequate lift efficiency and means for slow descent without power. While each condition can easily be met separately, the required settings of the lift screw pitch are very different in the two cases. If the lift screw is designed to rotate solely under the influence of the aerodynamic forces imposed upon it by the relative air-flow resulting from the motion of the machine through the air, which as is well known, is capable of providing safe descent without power, the pitch of the blades must be made relatively very small. On the other hand, for efficient vertical lift under power, a relatively much larger pitch angle is required. Pitch control mechanisms operated by the pilot I have deemed undesirable because, among other things, such pitch-control requires the unfailing judgment on the part of the pilot for correct operation.

Figure 8:
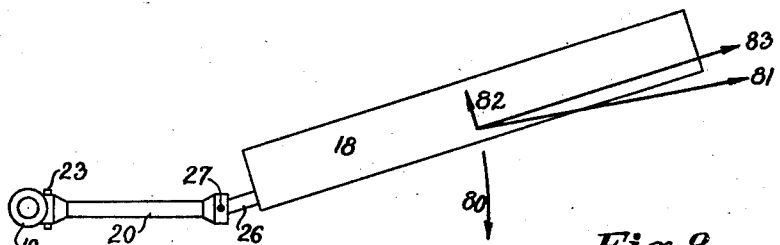
Figure 8 represents a diagrammatic plan view of the parts shown in Figure 6, arranged to illustrate the operation of the pitch regulator and showing also the relationship of some of the forces acting upon the rotor blade, the balance of which determines the pitch.

These difficulties are fully met in my novel construction by the simple automatic pitch regulator. The operation of this device is illustrated by the vector diagram, in plan view, in Figure 8, which shows (schematically) one blade 18 and its connections to the driving hub 19, the proportions being somewhat altered from those of Figure 1 for the purpose of greater clarity. The arrow 80 indicates the direction of rotation of the blade about the hub axis. The arrow 81 represents the direction and magnitude of the centrifugal force acting radially outward from the center of gravity of the blade. The arrow 82 represents the tangential force resulting from the air resistance or drag of the blade, and the arrow 83 represents the resultant force acting on the blade from the combined effects of the centrifugal and drag forces.

Obviously, if the blade is free to swing about the pivot 27, it will necessarily be in equilibrium only when the line of the resultant force 83 passes through the pivot 27. Therefore, if the drag force 82 is changed, the direction of the force 83 being thereby also changed, the blade must swing about the pivot 27 until the resultant force line is again brought into the pivot axis. The drag force 82 must at all times, during steady running, be balanced by the driving torque applied at the hub; for otherwise the unbalanced drag would cause a change in blade speed. Therefore it is seen that the angle of lag of the blade 18 with relation to the stub 20, is at all times, during steady running, a function only of the driving torque. For example, when there is no driving torque, as in autorotation, there is no lag and the stub and blade are in line. On the other hand, whenever the engine throttle is wide open the blade lags behind the stub to a maximum angular extent, determined by the weight of the blade and the relative proportions of the parts.

As has already been shown, any lag of the blade is accompanied by a rotation of the blade on its axis as the result of the geared connection between the stub and the blade, as illustrated particularly in Figure 7. Furthermore, it will be noticed from consideration of Figure 7 that an increase in lag is accompanied by an increase in pitch and vice versa. Consequently it is evident that an increase in driving torque is automatically accompanied by an increase in pitch.

Now if the gear ratio of the pitch regulator is suitably proportioned the blade may be given the best autorotative pitch setting when there is no driving torque and the most efficient lifting pitch when the full power is applied. Furthermore, the change in pitch will take place between the two extremes so as to maintain the rotational velocity of the blades approximately constant, or to increase or decrease it with increasing torque, according to the gear ratio employed. This characteristic of the automatic pitch regulator phase of my invention is especially valuable when the internal combustion engine is used as a source of power, because of the narrow range of rotational speeds available at good engine efficiencies.

In the hereinabove described phase of my invention, the blade angle may be increased (upon the application of power) or decreased (as required for auto-rotation) gradually in proportion to the torque. Thus, instead of connecting the power directly to the rotor shaft 36, the power may be delivered to a separate concentric shaft either surrounding the shaft 36 or extending through said shaft (in which case the shaft 36 will be tubular) and the torque transmitted from one shaft to the other through spring members which would be deformed in proportion to the torque delivered so that there will be a different angular disposition of the two shafts with respect to each other, according to the amount of torque being delivered from one to the other. This angular displacement of the driving shaft with respect to the driven shaft (according to the amount of torque being delivered) may then be transmitted to blade angle control means similar to the members 33 and 34, so that as the springs are deformed more and more by the increase in torque (that is, power delivered) the blade angle or blade pitch will be smoothly and automatically increased so as to provide a greater blade angle for the various conditions of vertical operation with power-driven rotor and so that when the power is removed from the rotor the blade angle will smoothly and automatically shift back into the auto-rotative condition, that is, to the lesser angle.

In this manner, the transition from the auto-rotative flight to power-driven rotor flight, and vice versa, may be effected more smoothly and with less effort and skill on the part of the operator.

By this means also, the transmission of power from engine to rotor may be more effectively cushioned by the spring member through which the power is actually transmitted from the driving shaft to the driven shaft of the rotor.

In such automatic flight control of the rotor blades, the stubs 20 are eliminated and the blade angle control means similar to the members 33 and 34 may be disposed at the blade roots in close proximity to the concentric shafts.

The following is a consideration of the flight operation and control of the aircraft of my present invention. In order to take off vertically from the ground it is only necessary to start the engine and open the throttle, as the driving torque increases in response to the throttle opening, the blades lag and their pitch increases to the best thrust setting without any knowledge or concern on the part of the pilot. When the rotor gets up to speed the machine will immediately leave the ground and rise vertically or in whatever inclined path is determined by the control settings.

As the machine leaves the ground the reaction from the torque of the rotor will tend to spin the entire structure of the craft about the rotor axis in a direction opposite to that of the rotor rotation. Obviously, if practical flight is to be achieved this tendency must be balanced and controlled. This balance and control is obtained by the antitorque surfaces 46. These are placed in the outer portion of the column of air (or slip-stream) propelled downwards by the fan action of the rotor and are so formed and each so disposed as to derive a lift force from the airflow over them, which tends to rotate the structure to which they are attached in the same direction as that of the rotor rotation; that is, opposite to that of the torque reaction.

In the novel arrangement of antitorque surfaces which I have disclosed the antitorque moments so developed are symmetrically disposed about the rotation axis.

With different operating conditions the torque reaction, as well as the air velocity over the antitorque surfaces, varies. To insure a correct balance at all times means are provided for varying the antitorque moment. The novel means here disclosed for this purpose include the mounting of a hinged flap 47 at the lower or trailing edge of each (or some) antitorque surface or element. The deflection of these flaps on their hinges, by the actuation of appropriate controls, as illustrated particularly in Figures 4 and 5, varies both the effective camber and the effective angular setting of the surfaces and thus changes the antitorque forces produced. I may pivot the entire surfaces, or I may apply the control means to less than the whole number of antitorque elements or surfaces, or separate auxiliary surfaces may be employed.

Thus, as the machine rises, if it tends to turn to the right, for example, the pilot sitting in seat 55, or seat 76, (Figures 4 or 15) presses forward with his left foot on the rudder bar 53, thus deflecting the flaps 47 in the direction of reduced camber and angle. The antitorque forces are thereby reduced and the torque reaction unbalanced sufficiently to rotate the craft to the left. An opposite control motion produces the opposite rotation. Plainly, in addition to providing means for insuring a correct torque balance, the hinged flaps and their control connections provide an effective means for directional control, while operating vertically with power on (as well as while operating under the auto-rotative condition).

Figure 9:
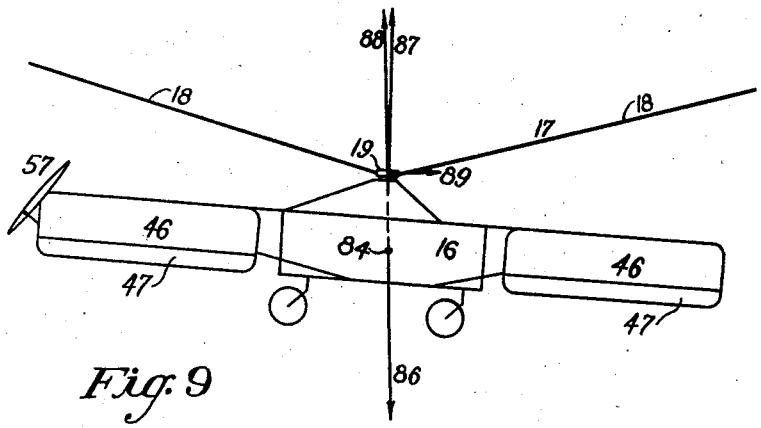
Figure 9 represents a diagrammatic side elevational view of the aircraft embodying my invention, shown generally in a condition of flight and arranged to illustrate a phase of the operation of the longitudinal controls.
Figure 10:
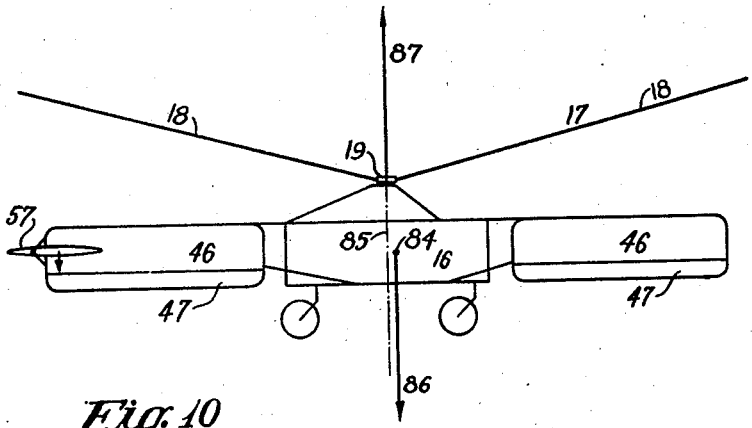
Figure 10 represents a similar diagrammatic side elevational view of the craft embodying my invention, illustrating a different phase of operation, that is, through a different setting of the longitudinal controls.

Having risen from the take-off space to a sufficient altitude to clear surrounding obstacles, the propulsion of the craft in any desired direction, and its control vertically and in forward flight, are effected generally as illustrated in the diagrams of Figures 9 and 10, and, for an alternative form of construction, of Figure 15. In both forms of construction illustrated, propulsion is obtained by tilting the rotor forward, with relation to the horizontal. For the type of control illustrated in Figures 9 and 10 the center of gravity of the entire machine is placed, by a suitable disposition of the weights to be carried (dead weight and/or pay loads), at the point 84 which is slightly in front of the extension of the rotor axis 85. Since the thrust of the rotor always acts on the rotor hub 19 the machine may be considered as being freely suspended from its center. Then if the elevator 57 is tilted or deflected to the position shown in Figure 9, so as to derive little or no force from the rotor slipstream, the center of gravity of the suspended structure will tend, under the influence of the gravity force indicated by the arrow 86, to take a position vertically under the hub, thus tilting the entire machine, including the rotor axis, forward. While the cone of the blade path will not tilt forward quite as much as the rotor axis, nevertheless it also will tilt forward. Since the rotor thrust force indicated by the arrow 87 is always approximately in line with the cone axis, it will likewise tilt forward, thus becoming resolvable into the vertical lift force 88, which balances the gravity force 86, and the horizontal thrust force, indicated by the short arrow 89, which propels the machine forward.

If, however, it is desired to remain stationary in the air, or to move only vertically through it, the elevator 57 is deflected, by a rearward motion of the handle of the (conventional) control stick, toward, or into, the position shown in Figure 10. The tabs 60 on the elevator are thus brought farther and more squarely into the downward air-flow or rotor slipstream and thus develop a downward force (indicated by the arrow) which tends to right the machine. Since this force acts on a much longer moment arm than the gravity force 86, it needs to be only comparatively small. If proportioned so as to produce an excess force, in the position of Figure 10, the position there shown will develop a rearward tilt of the craft (and rotor axis) and cause the machine to move backwards, while an intermediate setting or position, (possibly between those indicated in Figures 9 and 10) will be required for complete absence of horizontal motion (hovering for instance).

To obtain a high forward velocity the elevator is at first set in the position of Figure 9 which starts the machine forward in response to the horizontal thrust component 89. As the forward motion increases, the air flow over the elevator becomes inclined as the result of the combination of the horizontal relative wind and the rotor slipstream. The downward tail force is thus first reduced still further and then, as the air flow meets the under side of the elevator, the tail force is reversed. The upward force thus produced tilts the rotor still farther forward and thereby increases the magnitude of the horizontal force component. Thus, the forward motion and the upward tail force mutually increase each other until the maximum forward speed is attained, after which the elevator is used for longitudinal control, in a manner similar to the operation of conventional airplanes.

To reverse the process and bring the machine to a horizontal standstill, the control stick is pulled well back, thus bringing the elevator 57 into a depressed setting which, by producing a down force on the tail, tilts the rotor axis rearward. The resulting backward force component may bring the machine to a stop within a very short distance.

With the modified or alternative form of control illustrated in Figure 15, the elevator is dispensed with and the rotor is tilted by moving the center of gravity of the suspended structure forward or backward, through the pendular shifting of the weight of the suspended fuselage and its contents. Thus, pulling back the control stick 74 from the position shown rotates the sprocket 71, through the agency of the link 78 and the lever 73, thereby causing the entire fuselage to move backward with relation to the rotor. The center of gravity, being thus moved out of the vertical line through the suspension point in the rotor hub, immediately swings back and so produces a backward inclination of the rotor axis and the rotor thrust force. Similarly, the opposite motion of the control stick gives rise to forward propulsion and the control stick responses will in general be similar to those of the type of Figures 9 and 10.

The longitudinal control means, together with the directional control means provide complete lateral control when hovering, by first turning about the vertical axis and then proceeding in the desired direction. In the form of the construction shown in Figure 15, further means for lateral control may be provided by adding a pivot to allow lateral tilting of the rotor assembly in addition to the provision for longitudinal tilting shown.

The power plant may be either made to tilt along with the tilting of the rotor as is illustrated in Figure 15 or the power may be transmitted, through suitable universal joints, from the power plant, which is rigidly connected with the fuselage, to a tiltable rotor.

In tilting the power plant with the rotor, the power plant may be resiliently anchored to the fuselage by being pivoted with respect thereto.

The rotor and its rigidly associated power plant may also be made to tilt in both a longitudinal direction and a transverse direction. In this case, the engine would be pivotally anchored in the fore and aft or the longitudinal direction, and it might be spring-mounted or spring-confined in the transverse direction with the yield of the spring being sufficient to permit of the unnecessary lateral deflection of engine and rotor.

By disposing the fuselage 67 and tail surface 77, (77 preferably fixed, though it may be adjustable) with a normal forward and upward inclination (to a suitable degree) when the craft is in vertical operation (ascent, descent or hovering), the tail surface may automatically augment the tilting control. Thus, as forward speed is attained (by tilting about the pivot 70) the air stream passing the tail surface 77 will act upwardly or on its lower surface and thus tilt the entire craft forwardly. This further increases the forward or horizontal component of the rotor thrust and thus further increases the forward speed. This progressive and cumulative forward tilting effect of the tail surface (77) ceases when it levels off into the line of forward travel, which should take place at full forward speed or at a substantial forward speed. By reason of this relationship between the manual tilting control (of tilting the rotor-motor-anti-torque assembly relative to fuselage) and automatic and progressive tilting effect of the tail surface 77, the angular displacement about the pivot 70 may be substantially reduced.

Since, in both embodiments of my invention (Figures 2 and 15) the antitorque surfaces are tilted forward with the rotor axis, it is evident (especially from Figure 14 which shows the attitude in full speed forward flight) that in all important forward flight conditions, a component of air flow exists across the antitorque surfaces and their control flaps. These flaps with their connections thus remain effective for directional control in forward flight with power on just as in vertical flight. Only in certain restricted conditions of flight, such as a dive with low engine power, does the air-flow become parallel to the anti-torque surfaces and the control flaps therefore inoperative. A conventional rudder connected to the same controls is optional for providing directional control in these cases.

Figure 14:
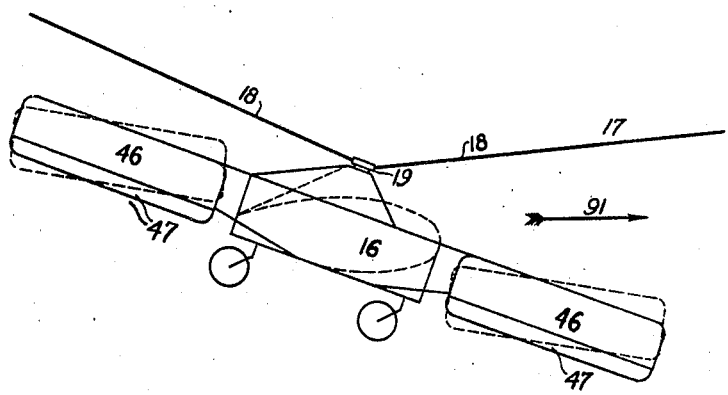
Figure 14 represents a diagrammatic side elevational view illustrating a method of varying the efficacy or effectiveness of the lateral controls in forward flight as well as reducing the drag of the fuselage and anti-torque surfaces.

One of the advantages of the novel arrangement of antitorque surfaces used in the craft of my present invention, is that not only does it provide the essential characteristic of symmetrical moment distribution, but it also presents only a small area in the direction of forward flight, and thus permits of relatively high speed in forward flight. In full speed forward flight however, with the setting of the anti-torque surfaces at a right angle to the rotor axis, this advantage may not be fully realized because the angle of tilt, as illustrated by the solid lines in Figure 14, presents to the air-flow (induced by flight) in the direction of the arrow 91, an unnecessarily large extent of antitorque surface area, both for control purposes and from the standpoint of head resistance. To overcome this, the antitorque surfaces may be inclined relative to the rotor axis, in the vertical plane, as indicated by the dotted lines in Figure 14, without appreciably impairing performance in vertical flight. The fuselage may similarly be inclined to reduce head resistance, as also indicated by dotted lines in Figure 14.

Figure 11:
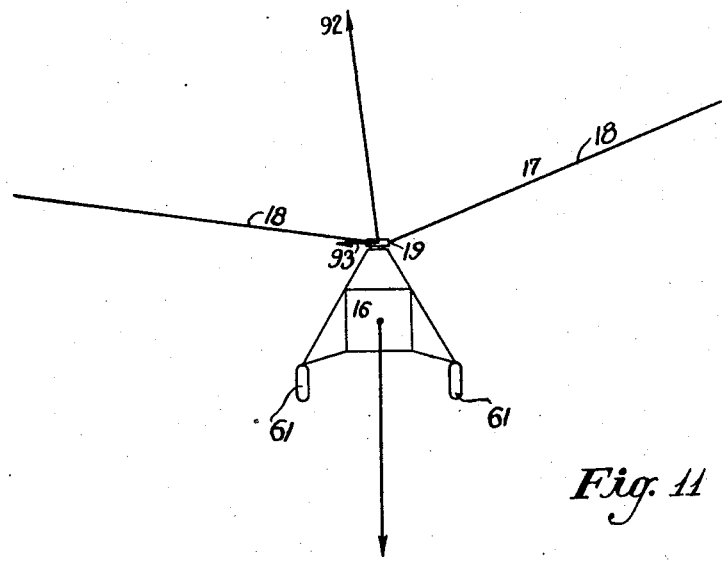
Figure 11 represents a diagrammatic front elevational view of any craft (not embodying my invention) illustrating a state of lateral force unbalance existing in the forward flight of an aircraft supported by a single articulated rotor.
Figure 12:
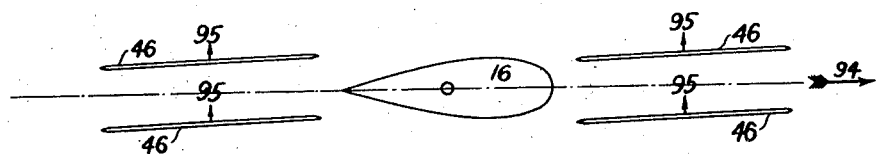
Figure 12 represents a diagrammatic top plan view of one form or one arrangement of the anti-torque surfaces according to my invention, illustrating the means of neutralizing the side force resulting from the condition shown in Figure 11.
Figure 13:
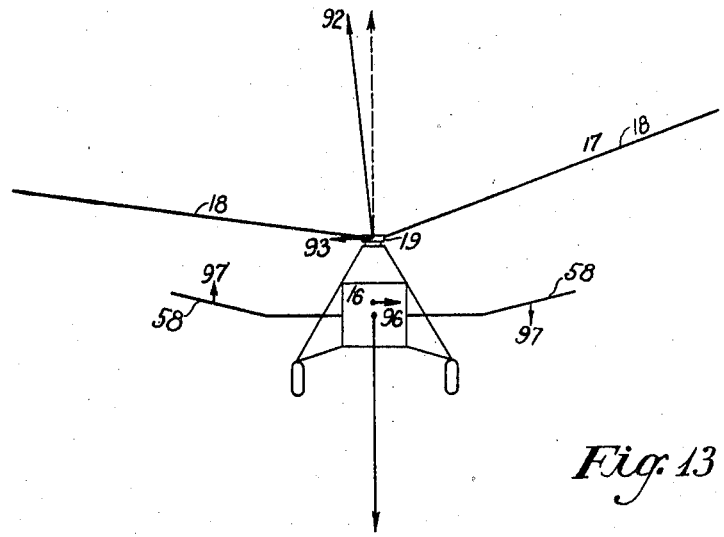
Figure 13 represents a diagrammatic front elevational view, similar to that shown in Figure 11, but illustrating the complete force balance obtainable by the means of my invention illustrated in Figure 12.

By a slight angular offset of the antitorque surfaces, relative to the longitudinal vertical median plane of the craft, in the manner indicated in Figure 12, I may also overcome the undesirable slight sidewise displacement of the craft, which otherwise would develop in the forward flight, due to the support of the craft by a single articulated rotor. This novel phase or feature of my present invention is illustrated in Figures 11, 12 and 13. Figure 11 illustrates the side-displacement tendency referred to above. As viewed from the front, the blades advance on the right side and retreat on the left side of the diagram, the relative velocity being therefore greater on the right than on the left. As a consequence, the lift force on the right is greater and the blades passing that side, in finding an equilibrium, are raised to a higher position than they are when passing the left side. In other words, the cone axis is angularly displaced to the left. Since the rotor thrust, represented by the arrow 92, is in line with the cone axis, this force is also inclined to the left, giving rise to a lateral component force, indicated (qualitatively) by the short arrow 93 which produces objectionable side-slipping if not overcome. The novel means of my present invention for overcoming this, is illustrated in Figure 12. It consists in inclining the antitorque surfaces 46 slightly with relation to the fuselage axis, so that they will be acted on, when in forward flight in the direction of arrow 94, by the relative air flow to produce the side forces indicated by the arrows 95. By suitable proportioning and inclination, the sum of these forces may be made equal and opposite to the lateral force 93. The resulting balance is illustrated in Figure 13, in which the arrow 96 represents the sum of the compensating forces derived from the antitorque surfaces. It will be noted that the only unbalance remaining is that due to the force 96 acting at a lower point than the equal and opposite force 93. This unbalance is in the nature of a simple rolling couple and may therefore be completely balanced out by a slight differential setting of the ailerons, resulting in the forces shown by the short arrows 97. While in the construction illustrated, the antitorque surfaces are employed to furnish the corrective side-force, this phase or feature of my invention is applicable also to rotative-winged aircraft without antitorque surfaces, by the use of auxiliary vanes suitably disposed, or with one auxiliary vane in front of the rotor axis to counterbalance a suitable lateral inclination of the conventional vertical tail surfaces. In still another embodiment of this phase of my invention, the fuselage itself may be employed to provide a lateral force by a suitable symmetrical construction or contour.

A feature of the novel method for correcting the forward flight unbalance disclosed above, is that it does not give rise to another unbalance in slow forward and vertical flight, as does the lateral offsetting of the rotor axis, because all the forces involved, both in producing the unbalance and in applying the corrective force, exist only in forward flight and diminish proportionately as the horizontal speed is reduced.

In the case of power failure, either accidentally or by voluntary throttle control, the automatic pitch regulator instantly sets the rotor blades in the predetermined autorotative angular position; whereupon the air flow caused by the motion of the machine through the air acts upon the blades to maintain the rotor in motion independent of the engine, as permitted by the freewheel clutch unit. Descent at low speed may then be effected either nearly vertically or at a long gliding angle in the manner already well known for purely autorotative aircraft.

In autorotative flight, the control operations are somewhat altered, owing to the fact that the torque reaction is no longer present, that the air flow of the rotor-slipstream is no longer available, and also that the airflow over the antitorque surfaces is upward instead of downward. The disappearance of the torque reaction requires that the antitorque surfaces must be neutral with respect to the upward air flow, if turning or spinning generally about the rotor axis line is to be avoided. While antitorque surfaces may be provided which would be neutral in reversed airflow, their area would be undesirably large, and therefore, in the embodiment of my invention here disclosed, the neutralization is accomplished with the flaps. Thus, when passing from power-on flight to autorotation, the pilot removes his feet from rudder bar 53 and, placing them on rudder bar 54, pushes forward with the right foot until the rudder bar 54 is brought into a generally transverse position. This action, by swinging the flaps 47 to the dotted positions 56, causes the required neutralization of the antitorque surfaces with respect to the reversed air-flow. The rudder bar 54 is thereafter used for directional control. Since the cable connections of the rudder bar 54 are reversed (on account of the opposite location of the horn 52) the motions of the flaps are opposite to that produced by the rudder bar 53 (for similar motions of the feet). In the reversed airflow therefore, the control responses are the same. As rudder bar 54 is swung into the transverse position, the power-on rudder bar 53 swings out of the way.

With the rigid motor mounting, since the maintenance of the required attitude for vertical operation depends on the pressure derived from the slipstream, strictly (or theoretically) vertical descent in autorotation is not possible. With the pivoted rotor mounting however, the longitudinal control is entirely independent of the slipstream, and consequently absolutely vertical autorotation may be accomplished.

Stability and rolling control in forward flight are provided by the use of dihedral surfaces and conventional ailerons in the well-known manner. In vertical and low speed flight, the cone angle of the rotor blades is adequate for stability.

On the ground, there being no propeller to provide horizontal thrust, the motor must be tilted to provide the propulsion needed for taxying. With the fixed rotor mounting shown in Figures 1, 2 and 3, this necessitates means for tilting the whole machine, such as the adjustable tail wheel already described. For the type with the tiltable rotor assembly shown in Figure 15, however, the normal longitudinal control is effective on the ground also.

One of the advantages of my novel construction over the purely autorotative, rotor supported aircraft, is that of control on the ground. Thus, the overturning tendency which has proved troublesome with this last-mentioned type craft, is avoided in my construction because the vertical force which is always available, when the engine is running, may be used to counteract any incipient tendency to overturn.

While I have shown the various phases and features of my invention in certain specific embodiments or combinations, I am aware that my invention and the several phases or features thereof may be embodied in other forms without departing from the spirit or essential attributes thereof, and I therefore desire the present embodiments to be considered in all respects as illustrative and not restrictive, reference being had to the appended claims rather than to the foregoing description, to indicate the scope of the invention.

Having thus described the invention what is hereby claimed as new and described to be secured by Letters Patent is:

1. In an aircraft, a lift screw, parallel antitorque surfaces disposed in two groups, one in front of and the other behind the rotational axis of said light screw, said surfaces each being parallel to the fore and aft axis of said aircraft, and means for varying the effectiveness of said antitorque surfaces.

2. In an aircraft, a lift screw, a plurality of anti-torque surfaces arranged in two groups, one group being mounted in front of and the other group being mounted behind the rotational axis of said lift screw, the surfaces in each group being parallel to each other and all of said surfaces extending parallel to the fore and aft axis of said aircraft, generally horizontally hinged flaps attached to said anti-torque surfaces, and control means for swinging said flaps about their hinges.

3. In an aircraft, a lift screw, antitorque surfaces, hinged flaps attached to said anti-torque surfaces, a pivoted control lever operatively connected to said flaps, and a second pivoted control lever operatively connected to said flaps with reversed connections.

4. In an aircraft, an overhead power-driven lift screw mounted to rotate on an axis behind the center of gravity, an elevator surface at the rear, said elevator having forwardly extending tabs movable into different angular settings relative to and within the slipstream of said overhead power-driven lift screw, and means for controlling said elevator.

5. In an aircraft, an overhead power-driven lift screw, and control means consisting in an elevator having tabs movable into different angular settings relative to and within the slipstream of said overhead power-driven lift screw.

6. In an aircraft having a power plant, an aerodynamic lift unit mounted on said power plant in fixed axial relation thereto and anti-torque surfaces rigidly connected to said power plant for opposing the torque reaction set up by said aerodynamic lift unit, a fuselage pivotally attached to said power plant, and means for tilting said fuselage relative to said power plant and said rigidly connected anti-torque surfaces.

7. In an aircraft having a power plant, a lift screw mounted on said power plant in fixed axial relation thereto and anti-torque surfaces rigidly connected to said power plant for opposing the torque reaction set up by said lift screw, a fuselage pivotally attached to said power plant, and means for tilting said fuselage relative to said power plant and said rigidly connected anti-torque surfaces.

8. In an aircraft, a power plant, a lift screw mounted on said power plant in fixed axial relation thereto, anti-torque surfaces rigidly attached to said power plant, a fuselage pivotally attached to said power plant, and means for tilting said fuselage relative to said power plant.

9. An aircraft supported by rotating articulated airfoils capable of producing a side force at the hub of said airfoils during forward flight, and a non-rotating structure extending ahead of and behind the axis of rotation of said airfoils and capable of producing aerodynamic side forces in forward flight all acting in a direction generally opposite that of the side force at said hub, thereby to avoid yawing during forward flight.

10. In an aircraft, a lift screw, a liquid cooled engine adapted to drive said lift screw, anti-torque surfaces, radiating means forming part of said surfaces and means for circulating liquid from the engine through said radiating means.

11. In an aircraft, a lift screw, a liquid cooled engine adapted to drive said lift screw, anti-torque surfaces supported by tubular members, radiating means within said surfaces and suitable connections for the circulation of the cooling liquid through said tubular members.

12. In an aircraft having an overhead power-driven lift screw as its sole means of propulsion, means for supporting said aircraft on the ground comprising a plurality of ground contacting members, and means for varying the effective height of at least one of said members whereby the lift screw axis may be tilted relative to the ground to provide a propulsive force for taxying.

13. In an aircraft having an overhead power-driven lift screw as its sole means of propulsion, means for adjusting the undercarriage whereby the lift screw axis may be tilted relative to the ground to provide a propulsive force for taxying.

14. An aircraft having a power plant, a lift screw, driving means intermediate said lift screw and power plant, means for automatically varying the pitch of the lift screw, and generally parallel anti-torque surfaces disposed ahead of and behind the center of gravity of said aircraft for neutralizing the torque reaction of the lift screw, said surfaces each being generally parallel to the normal forward flight direction.

15. An aircraft having a power plant, a lift screw, driving means intermediate said lift screw and power plant, means for automatically disengaging the power drive, means for automatically varying the pitch of the lift screw, generally parallel anti-torque surfaces disposed ahead of and behind the center of gravity of said aircraft for neutralizing the torque reaction of the lift screw, said surfaces each being generally parallel to the normal forward flight direction and means for varying the effectiveness of said anti-torque surfaces.

16. An aircraft having a power plant, a lift screw, driving means intermediate said lift screw and power plant, means for automatically disengaging the power drive, means for automatically varying the pitch of the lift screw, generally parallel anti-torque surfaces disposed ahead of and behind the center of gravity of said aircraft for neutralizing the torque reaction of the lift screw, said surfaces each being generally parallel to the normal forward flight direction means for varying the effectiveness of said anti-torque surfaces, and means separate from said anti-torque surfaces coacting with the slipstream of the lift screw for tilting the lift screw relative to the horizontal.

17. An aircraft having a fuselage, a power plant, a lift screw, driving means intermediate said lift screw and power plant, means for automatically disengaging the power drive, means for automatically varying the pitch of the lift screw, generally parallel anti-torque surfaces disposed ahead of and behind the center of gravity of said aircraft for neutralizing the torque reaction of the lift screw, said surfaces each being rigidly attached to said power plant generally parallel to the normal forward flight direction, means for varying the effectiveness of said anti-torque surfaces, and means for tilting said lift screw relative to said fuselage.

18. In an aircraft, a power plant, a lift screw mounted on said power plant in fixed axial relation thereto, anti-torque surfaces rigidly connected with said power plant, a fuselage pivotally connected to said power plant, means for tilting said fuselage relative to said power plant and anti-torque control means concentrically related at one portion thereof with the pivot between power plant and fuselage for varying the effectiveness of said anti-torque surfaces.

19. In an aircraft, hovering means comprising an overhead power-driven lift screw, a power plant for rotating said lift screw, and control means consisting of an adjustable elevator pivotable about an axis generally transverse to the longitudinal axis of the craft and formed with tabs movable into different angular settings relative to and within the slipstream of said power-driven lift screw, whereby the direction of the axis of rotation of said lift screw may be varied to control horizontal movement of the aircraft.

20. In an aircraft, hovering means comprising a lift screw, a power plant for rotating said lift screw, variable anti-torque surfaces constituting directional control means, and means for controlling the direction of the axis of rotation of said lift screw comprising a fuselage pivotally and directly attached to said power plant and means for tilting said fuselage relative to said power plant, whereby horizontal movement of said aircraft may be controlled.

21. In an aircraft including an overhead power-driven lift screw rotating about an axis behind the center of gravity of said aircraft and a power plant for rotating said lift screw, means for tilting the axis of rotation of said power-driven lift screw consisting in a transversely pivoted controllable vane at the rear of the aircraft continuously surfaced on its opposite sides, said vane being adapted to coact with both the slipstream of said overhead power-driven lift screw and the relative horizontal air-flow on opposite surfaces thereof, whereby longitudinally movement of the aircraft may be effected.

22. In an aircraft including a lift screw mounted on a power plant in fixed axial relation thereto and a fuselage pivotally attached to said power plant, limited means for assisting longitudinal movement of the aircraft comprising an upwardly tilted tail surface rigidly secured to said fuselage and adapted to aid longitudinal movement by coacting with the relative horizontal air-flow on the under side thereof.

23. In an aircraft including a lift screw rotating about an axis behind the center of gravity, longitudinal and directional control means, said longitudinal control means consisting of a controllable vane at the rear coacting with the slipstream of the lift screw, and said directional control means including generally vertically disposed and generally parallel surfaces mounted ahead of and behind the center of gravity, generally horizontal hinged flaps attached to said surfaces and means for swinging said flaps about their hinges.

24. In an aircraft including a power plant, a lift screw mounted on said power plant in fixed axial relation thereto and a fuselage pivotally attached to said power plant, longitudinal and directional control means, and longitudinal control means consisting of means for tilting said fuselage relative to said power plant, and said directional control means including generally vertically disposed and generally parallel surfaces mounted ahead of and behind the center of gravity, generally horizontally hinged flaps attached to said surfaces and means for swinging said flaps about their hinges.

25. In an aircraft supported by a power-driven articulated rotor, automatic means for producing a corrective side force directly proportional to the longitudinal air-velocity of the aircraft, said means comprising aerodynamically active surfaces disposed ahead of and behind the axis of rotation of said rotor, said surfaces being inclined with respect to the line of flight.

26. In an aircraft having a lift screw and anti-torque surfaces generally parallel to the line of flight, means for setting the leading edges of said anti-torque surfaces at an angle to a plane normal to the axis of rotation of said lift screw, whereby the relative effectiveness of said anti-torque surfaces may be adjusted for forward flight.

27. In an aircraft supported by rotating airfoils and having generally vertical control surfaces, means for setting the upper edges of said control surfaces at an angle to a plane normal to the axis of rotation of said supporting airfoils, whereby the relative effectiveness of said control surfaces may be adjusted for forward flight.

28. In an aircraft supported by rotating airfoils and having generally vertical control surfaces, means for reducing the wind resistance of said control surfaces in forward flight, said means including means for setting the upper edges of said surfaces at an angle to a plane normal to the axis of rotation of the supporting airfoils.

29. In an aircraft of the class described and including a single articulated rotor capable of producing a side force at the rotor hub during forward flight and aerodynamically active surfaces inclined to the normal line of flight capable of producing corrective side forces, but spaced from said hub, the combination of said rotor and said aerodynamically active surfaces being capable of producing in forward flight a rolling couple, means for neutralizing said rolling couple and thereby providing stability in forward flight comprising a pair of pivoted ailerons disposed at the tail of said craft.

30. An aircraft of the class described including a fuselage, a plurality of frame members rigidly connected to said fuselage and extending upwardly therefrom, a power plant pivotally supported between said upwardly extending frame members in spaced relation from said fuselage, said power plant being pivotable about an axis generally transverse to the normal forward flight direction, a single lift screw mounted immediately above said power plant in coaxial relation thereto, adjustable means interconnecting said power plant with said fuselage for longitudinally tilting said lift screw about said transverse axis, and anti-torque airfoil surfaces rigidly connected to said power plant fore and aft and disposed within the slip stream of said lift screw and provided with controllable hinged flaps affording directional control means.

31. In an aircraft, a lift-screw, parallel anti-torque airfoil surfaces supported on the aircraft by means leaving substantially unobstructed the leading edge of the anti-torque surfaces, said anti-torque surfaces cooperating with the slipstream of the lift-screw to oppose the torque reaction thereof, said anti-torque surfaces being disposed in two groups, fore and aft, respectively, of the line of the axis of rotation of the lift-screw, said groups of anti-torque surfaces producing more or less approximately equal anti-torque moments, and the surfaces of each group being generally parallel to each other and all the anti-torque surfaces being generally parallel to the fore and aft axis of the aircraft.

32. In an aircraft, a lift-screw, parallel anti-torque airfoil surfaces supported on the aircraft by means leaving substantially unobstructed the leading edge of the anti-torque surfaces, said anti-torque surfaces cooperating with the slipstream of the lift-screw to oppose the torque reaction thereof, said anti-torque surfaces being disposed fore and aft, respectively, of the line of the axis of rotation of the lift-screw, said anti-torque surfaces producing more or less approximately equal anti-torque moments, and said anti-torque surfaces being generally parallel to each other and to the fore and aft axis of the aircraft.

HAVILAND H. PLATT.